(12) United States Patent
Bernhardt (10) Patent No.: US 10,371,415 B2
(45) Date of Patent: Aug. 6, 2019

(54) ELECTRONICS OPERATION FOR TEMPERATURE CONTROLLED SYSTEMS

(71) Applicant: The Boeing Company, Chicago, IL (US)

(72) Inventor: Roger David Bernhardt, O'Fallon, MO (US)

(73) Assignee: The Boeing Company, Chicago, IL (US)

(*) Notice: Subject to any disclaimer, the term of this patent is extended or adjusted under 35 U.S.C. 154(b) by 662 days.

(21) Appl. No.: 14/183,879

(22) Filed: Feb. 19, 2014

(65) Prior Publication Data
US 2015/0233605 A1 Aug. 20, 2015

(51) Int. Cl.
*F24H 9/20* (2006.01)
*G06F 9/50* (2006.01)
*G05D 23/19* (2006.01)

(52) U.S. Cl.
CPC ....... F24H 9/2071 (2013.01); G05D 23/1934 (2013.01); G06F 9/5094 (2013.01); Y02D 10/22 (2018.01)

(58) Field of Classification Search
CPC .................................................. F24H 9/2071
USPC .................... 62/175; 236/49.3; 700/277, 300
See application file for complete search history.

(56) References Cited

U.S. PATENT DOCUMENTS

| | | | |
|---|---|---|---|
| 3,569,714 A * | 3/1971 | Anderson | B64G 1/422 250/428 |
| 5,297,261 A * | 3/1994 | Kuranaga | G06F 1/24 710/104 |
| 5,491,610 A * | 2/1996 | Mok | G06F 1/206 257/E23.099 |
| 5,570,585 A * | 11/1996 | Vaynberg | F25B 1/10 62/175 |
| 5,896,259 A * | 4/1999 | Farwell | H01L 23/34 219/209 |
| 5,973,302 A * | 10/1999 | Petrosino | G06F 1/1616 219/201 |
| 6,091,255 A | 7/2000 | Godrey | |
| 6,682,016 B1 * | 1/2004 | Peroulakis | B64D 37/32 244/135 R |
| 6,928,881 B2 * | 8/2005 | Brennan | G01M 5/0083 73/766 |
| 8,290,728 B2 | 10/2012 | Drapkin et al. | |
| 8,358,145 B1 | 1/2013 | Ferris et al. | |

(Continued)

FOREIGN PATENT DOCUMENTS

JP 2004325035 * 11/2004

OTHER PUBLICATIONS

What is a "DIE" package—Electrical Engineering Stack Exchange, Feb. 2013.*

(Continued)

*Primary Examiner* — Henry T Crenshaw
(74) *Attorney, Agent, or Firm* — Yee & Associates, P.C.

(57) ABSTRACT

An apparatus and method of controlling temperatures of a plurality of locations on a structure. A temperature at each of the plurality of locations is identified. A desired temperature for each of the plurality of locations is identified. Processing of a workload by a processor at each of the plurality of locations is controlled to control the temperature at each of the plurality of locations to match the corresponding desired temperature for each of the plurality of locations.

17 Claims, 5 Drawing Sheets

(56) References Cited

U.S. PATENT DOCUMENTS

| | | | |
|---|---|---|---|
| 8,400,091 B2 | 3/2013 | Sato et al. | |
| 8,412,962 B2* | 4/2013 | Gaskins | G06F 1/206 |
| | | | 327/113 |
| 8,533,496 B1 | 9/2013 | Varnica et al. | |
| 8,546,904 B2 | 10/2013 | Chen et al. | |
| 2003/0147214 A1* | 8/2003 | Patel | G06F 1/20 |
| | | | 361/699 |
| 2004/0262409 A1* | 12/2004 | Crippen | F24F 11/006 |
| | | | 236/49.3 |
| 2006/0279423 A1* | 12/2006 | Nazari | G08B 13/19632 |
| | | | 340/541 |
| 2008/0147363 A1* | 6/2008 | Dalton | G06F 1/206 |
| | | | 703/5 |
| 2008/0282252 A1 | 11/2008 | Prasanna et al. | |
| 2009/0099705 A1* | 4/2009 | Harris | G06F 1/206 |
| | | | 700/300 |
| 2010/0011781 A1* | 1/2010 | Lents | B64D 13/00 |
| | | | 62/3.7 |
| 2012/0158190 A1* | 6/2012 | Belady | F24F 5/0096 |
| | | | 700/277 |
| 2012/0319759 A1 | 12/2012 | Kobayashi | |
| 2013/0043927 A1 | 2/2013 | Penzes et al. | |

OTHER PUBLICATIONS

"Research could bring new devices that control heat flow," www.sciencecodex.com, posted Jan. 28, 2014, 3 pages. http://www.sciencecodex.com/research_could_bring_new_devices_that_control_heat_flow-126885.

PCT Search Report dated Apr. 16, 2015, regarding application PCT/US2015/011562, 11 pages.

* cited by examiner

ELECTRONICS OPERATION FOR TEMPERATURE CONTROLLED SYSTEMS

BACKGROUND INFORMATION

1. Field

The present disclosure relates generally to data processing and to the operation of electronic devices that may affect temperature or be affected by temperature. Still more particularly, the present disclosure relates to controlling the operation of data processing devices and other devices on a structure, such as an aircraft, to process a workload and control the temperature of temperature sensitive devices at various locations on the structure.

2. Background

Various types of processors may be used to process various types of data. For example, processors may include general purpose microprocessors and specialized processors that are configured to process particular types of data. Signal processors that are configured to process particular types of signals may be one example of specialized processors.

One characteristic of processors is that processors generate heat while in operation. Higher operating speeds generate more heat. Another characteristic of processors is that the temperature of a processor may affect the performance of the processor. For example, if the temperature of a processor is too high, the ability of the processor to process data may be affected in an undesired manner. In some cases, a processor may be damaged if the temperature of the processor reaches an excessively high level. Therefore, it is desirable that excess heat is removed from the operating processors.

The operation of other electrical, electromechanical and micro-electromechanical devices also may be affected by temperature. A crystal oscillator is an example of a device that is affected by temperature. A crystal oscillator is an electronic oscillator circuit that uses the mechanical resonance of a vibrating crystal of piezoelectric material to create an electrical signal with a very precise frequency. However, the frequency of the electrical signal produced by such an oscillator may change if the temperature of the oscillator is greater than or less than the desired operating temperature of the oscillator.

It may be desirable to control the temperature of a device, such as a crystal oscillator or another device, to maintain a desired level of accurate performance of the device. For example, the temperature of electronic devices used in navigation and timing circuits on aircraft may need to be increased or decreased to maintain predictability and consistency of operation. Currently, resistive heaters and hermetically sealed covers may be used to create oven structures around electronic devices to maintain the desired temperature of such devices.

Accordingly, it would be beneficial to have a method and apparatus that take into account one or more of the issues discussed above, as well as possibly other issues.

SUMMARY

The illustrative embodiments of the present disclosure provide a method of controlling temperatures of a plurality of locations on a structure. A temperature at each of the plurality of locations is identified. A desired temperature for each of the plurality of locations is identified. Processing of a workload by a processor at each of the plurality of locations is controlled to control the temperature at each of the plurality of locations to match the corresponding desired temperature for each of the plurality of locations.

The illustrative embodiments of the present disclosure also provide an apparatus comprising a temperature sensor at each of a plurality of locations on a structure, a processor at each of the plurality of locations, and a controller. Each temperature sensor is configured to identify a temperature at a corresponding one of the plurality of locations. The controller is configured to receive information identifying the temperature at each of the plurality of locations from the corresponding temperature sensor at each of the plurality of locations. The controller is further configured to control processing of a workload by the processor at each of the plurality of locations to control the temperature at each of the plurality of locations to match a desired temperature for each of the plurality of locations.

The illustrative embodiments of the present disclosure also provide a method of controlling a temperature at a location on a structure. The temperature at the location is identified. A desired temperature for the location is identified. Processing of a workload by a processor at the location is controlled to increase the temperature at the location to match the desired temperature for the location.

The features, functions, and benefits can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of illustrative embodiments of the present disclosure when read in conjunction with the accompanying drawings, wherein:

DETAILED DESCRIPTION

The different illustrative embodiments recognize and take into account a number of different considerations. "A number," as used herein with reference to items, means one or more items. For example, "a number of different considerations" are one or more different considerations.

The different illustrative embodiments recognize and take into account that processors operating to process a workload on a structure, such as an aircraft, produce heat. The different illustrative embodiments also recognize and take into account that it may be desirable to remove excess heat from such processors to maintain the performance of such processors. The different illustrative embodiments further recognize and take into account that the temperature of other devices on an aircraft or other structure may need to be increased to maintain the desired performance of such devices.

The different illustrative embodiments recognize and take into account that the heat produced by data processing on an aircraft or other structure may be used to maintain the desired temperature of other devices on the aircraft or other structure. In accordance with an illustrative embodiment, the processing of a workload by processors at various locations on an aircraft or other structure may be controlled to control the temperature of both the processors and other devices at the various locations on the structure in a desired manner. In accordance with an illustrative embodiment, heat produced by processing a workload is not wasted, but may be used to increase and maintain the temperature of other components in a controlled manner. Thermoelectric devices may be provided at the various locations on an aircraft or other structure and controlled along with the processors at the locations to maintain the locations at desired temperatures. The need for resistive heaters and oven structures to maintain desired temperatures of various devices on an aircraft or other structure thus may be managed.

Figure 1:
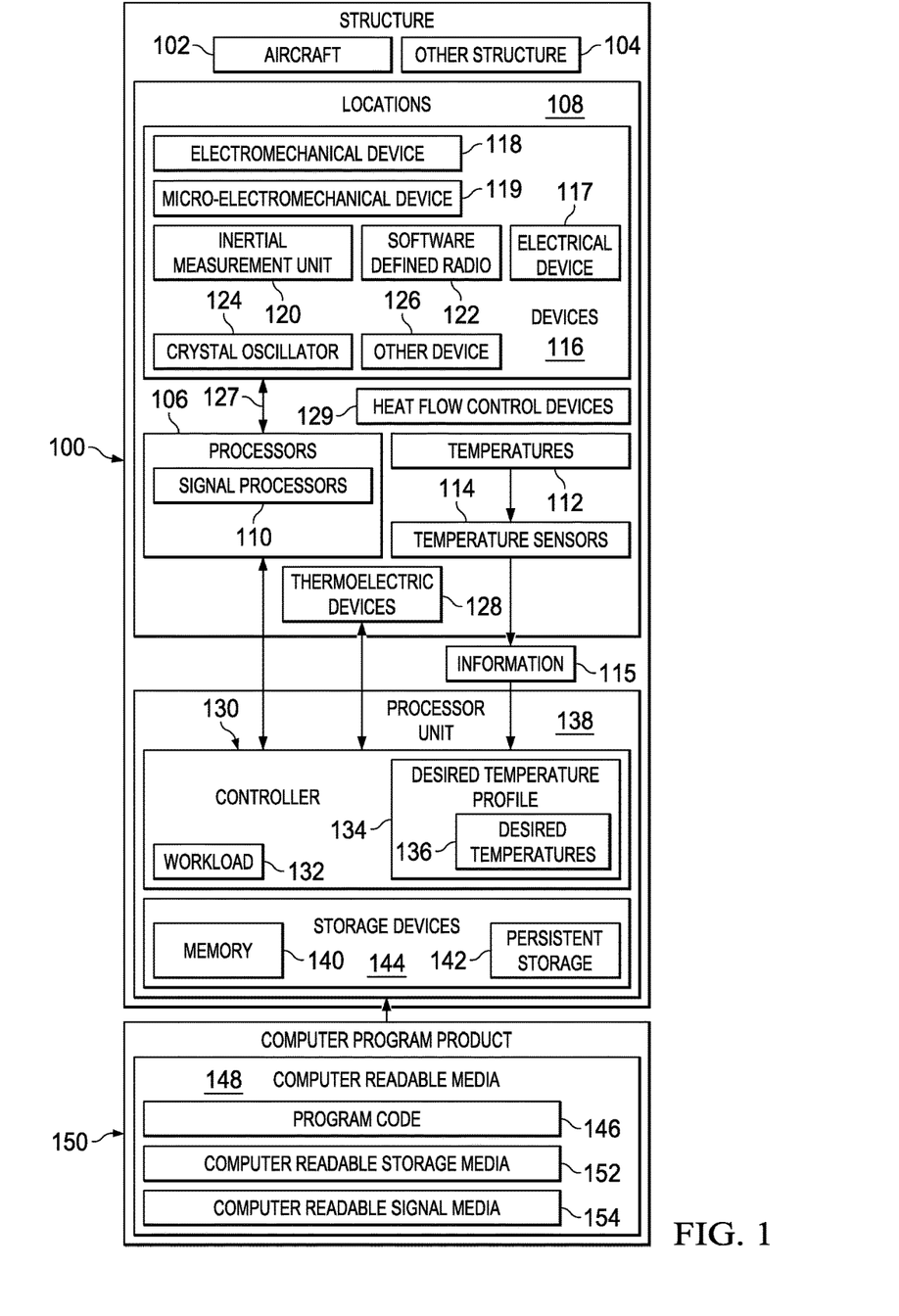
FIG. 1 is an illustration of a block diagram of a system for controlling data processing operations and temperatures of a plurality of locations on a structure in accordance with an illustrative embodiment.

Turning to FIG. 1, an illustration of a block diagram of a system for controlling data processing operations and temperatures of a plurality of locations on a structure is depicted in accordance with an illustrative embodiment. Structure 100 may be any appropriate structure on which data processing takes place. For example, structure 100 may be aircraft 102 or other structure 104.

Aircraft 102 may be any appropriate type of aircraft. For example, without limitation, aircraft 102 may be a fixed wing aircraft, a rotary wing aircraft, or a lighter-than-air vehicle. Aircraft 102 may be an aerospace vehicle that is configured to operate in the air, in outer space, or both. Aircraft 102 may be manned or unmanned.

Other structure 104 may be a vehicle or other mobile structure other than aircraft 102. For example, without limitation, other structure 104 may be a vehicle configured for operation on land, on water, under water, or in any other medium or combination of mediums. Other structure 104 may be a part of aircraft 102 or another mobile structure. Alternatively, other structure 104 may be a non-mobile platform or other appropriate structure.

Structure 100 includes processors 106 at a plurality of locations 108 on structure 100. Any appropriate number of processors 106 may be located at each of the plurality of locations 108 on structure 100. Processors 106 may be arranged in any appropriate configuration with respect to each other at the plurality of locations 108 on structure 100.

Processors 106 may include any appropriate devices configured to process any appropriate data. For example, without limitation, processors 106 may include general purpose data processing devices, special purpose data processing devices, or both. For example, without limitation, processors 106 may include signal processors 110 or other appropriate data processing devices at one or more of locations 108 on structure 100.

Locations 108 may be characterized by temperatures 112. Temperatures 112 also may be referred to as the current temperatures or actual temperatures of locations 108. Temperatures 112 at locations 108 may correspond to the temperatures of processors 106 at corresponding ones of locations 108.

Temperatures 112 may be identified using any appropriate temperature sensors 114. Temperature sensors 114 may be implemented in any appropriate manner along with processors 106 at locations 108 on structure 100. Temperature sensors 114 may be configured to generate information 115 in any appropriate form to identify temperatures 112 or from which temperatures 112 may be identified.

Devices 116 other than processors 106 may be located along with processors 106 at one or more of locations 108. Devices 116 may include any devices that may be affected by temperatures 112 at locations 108. In other words, devices 116 may be temperature sensitive devices. Devices 116 may include electrical device 117, electromechanical device 118, micro-electromechanical device 119, or any appropriate combination of such devices. For example, without limitation, devices 116 may include, inertial measurement unit 120, software defined radio 122, crystal oscillator 124, other device 126, or any combination of such devices. For example, without limitation, other device 126 may include a camera or other device that may be affected by temperatures 112 at locations 108. Devices 116 may be implemented in any appropriate manner along with processors 106 at locations 108 on structure 100.

In cases where devices 116 are located along with processors 106 at locations 108, temperatures 112 may refer to the temperatures of processors 106, the temperatures of devices 116, or both. In this case, temperature sensors 114 may be configured in an appropriate manner to identify temperatures 112 of processors 106, temperatures 112 of devices 116, or both.

In cases where devices 116 are located along with processors 106 at locations 108, processors 106 may comprise signal processors 110 configured to process signals 127 associated with devices 116 at corresponding locations 108. Signals 127 associated with devices 116 may include any signals or other data that is provided by devices 116, provided to devices 116, or both.

Thermoelectric devices 128 also may be located along with processors 106, or along with processors 106 and devices 116, at one or more of locations 108. Thermoelectric devices 128 may include any devices that use the thermoelectric effect for the direct conversion of an electric voltage to a temperature difference across the device, and vice versa. Thermoelectric devices 128 may be referred to as Peltier devices, Peltier heat pumps, solid state refrigerators, thermoelectric coolers, or in any other appropriate manner. Thermoelectric devices 128 may be used for heating or cooling, or both heating and cooling, at locations 108. Alternatively, or in addition, thermoelectric devices 128 may be used as thermoelectric generators that generate a voltage in response to a temperature difference across the device. Thermoelectric devices 128 may be implemented in any appropriate manner along with processors 106, or along with processors 106 and devices 116, at locations 108 on structure 100.

Heat flow control devices 129 may be located at one or more of locations 108, between one or more of locations 108, or both. Heat flow control devices 129 may include any appropriate devices or structures that permit a greater flow of heat in one direction than in the opposite direction. For example, without limitation, heat flow control devices 129 may comprise thermal rectifiers. Heat flow control devices 129 may be configured and positioned to control the flow of heat between locations 108 in a desired manner. Alternatively, or in addition, heat flow control devices 129 may be configured and positioned to control the flow of heat within individual ones of locations 108 in a desired manner.

In accordance with an illustrative embodiment, controller 130 is configured to control the processing of workload 132 by processors 106 and temperatures 112 of locations 108 in an integrated manner such that workload 132 is processed in an appropriate manner and desired temperature profile 134 of structure 100 is achieved and maintained. Workload 132 may comprise any number of data processing tasks that are to be performed on structure 100.

Desired temperature profile 134 may be defined, for example, by desired temperatures 136 for locations 108 on structure 100. Desired temperature profile 134 may be defined for use by controller 130 in any appropriate manner. For example, desired temperature profile 134 may be fixed or changeable. For example, without limitation, desired temperature profile 134 may be changeable by a user, changeable automatically in response to changing conditions, or changeable in another appropriate manner or combination of manners.

Desired temperatures 136 may be the desired operating temperatures of processors 106 at locations 108, the desired operating temperatures of devices 116 at locations 108, or other desired temperatures for locations 108 on structure 100. Desired temperatures 136 may be specific temperatures, ranges of temperatures, temperature thresholds, or may be expressed in any other appropriate manner or combination of manners.

Any appropriate algorithm may be implemented by controller 130 to control processing of workload 132 and temperatures 112 of locations 108 on structure 100 in an integrated manner. For example, controller 130 may be configured to receive information 115 from temperature sensors 114 identifying temperatures 112 at locations 108. Controller 130 may be configured to compare temperatures 112 at locations 108 to desired temperatures 136 for locations 108 as defined by desired temperature profile 134 for structure 100. Controller 130 may then distribute the processing of workload 132 among processors 106 such that workload 132 is processed in an appropriate manner and such that the heat generated by processors 106 processing workload 132 causes temperatures 112 of locations 108 to match desired temperatures 136 for locations 108 on structure 100. Controller 130 also may be configured to control thermoelectric devices 128 along with the processing of workload 132 by processors 106 in an integrated manner to achieve and maintain desired temperature profile 134 of structure 100.

Controller 130 may be configured to change the portions of workload 132 processed by individual ones of processors 106 to increase or decrease temperatures 112 at locations 108 to match desired temperatures 136 for locations 108. For example, without limitation, controller 130 may be configured to increase the processing of workload 132 by selected ones of processors 106 to increase temperatures 112 at corresponding locations 108. Controller 130 may be configured to decrease the processing of workload 132 at selected ones of processors 106 to reduce temperatures 112 at corresponding locations 108. For example, without limitation, controller 130 may be configured to change the processing of workload 132 by processors 106 by moving threads and clocking among processors 106 to locations 108 where heat is needed to achieve and maintain desired temperature profile 134.

The functions performed by controller 130 may be implemented in hardware or in hardware in combination with software in processor unit 138. For example, without limitation, controller 130 may be implemented in processor unit 138 that may include one or more of processors 106 at one or more of locations 108 on structure 100. Alternatively, or in addition, functions performed by controller 130 may be implemented in processor unit 138 on structure 100 other than processors 106.

Processor unit 138 may serve to execute instructions for software that may be loaded into memory 140. Processor unit 138 may be a number of processors, a multi-processor core, or some other type of processor, depending on the particular implementation. A number, as used herein with reference to an item, means one or more items. Further, processor unit 138 may be implemented using a number of heterogeneous processor systems in which a main processor is present with secondary processors on a single chip. As another illustrative example, processor unit 138 may be a symmetric multi-processor system containing multiple processors of the same type.

Memory 140 and persistent storage 142 are examples of storage devices 144. A storage device is any piece of hardware that is capable of storing information, such as, for example, without limitation, data, program code in functional form, and/or other suitable information either on a temporary basis and/or a permanent basis. Storage devices 144 may also be referred to as computer readable storage devices in these examples. Memory 140, in these examples, may be, for example, a random access memory or any other suitable volatile or non-volatile storage device. Persistent storage 142 may take various forms, depending on the particular implementation.

For example, persistent storage 142 may contain one or more components or devices. For example, persistent storage 142 may be a hard drive, a flash memory, a rewritable optical disk, a rewritable magnetic tape, or some combination of the above. The media used by persistent storage 142 also may be removable. For example, a removable hard drive may be used for persistent storage 142.

Instructions for the operating system, applications, and/or programs may be located in storage devices 144, which are in communication with processor unit 138 through an appropriate communications fabric. In these illustrative examples, the instructions are in a functional form on persistent storage 142. These instructions may be loaded into memory 140 for execution by processor unit 138. The processes of the different embodiments may be performed by processor unit 138 using computer-implemented instructions, which may be located in a memory, such as memory 140.

These instructions are referred to as program instructions, program code, computer usable program code, or computer readable program code that may be read and executed by a processor in processor unit 138. The program code in the different embodiments may be embodied on different physical or computer readable storage media, such as memory 140 or persistent storage 142.

Program code 146 is located in a functional form on computer readable media 148 that is selectively removable and may be loaded onto or transferred to processor unit 138 for execution by processor unit 138. Program code 146 and computer readable media 148 form computer program product 150 in these examples. In one example, computer readable media 148 may be computer readable storage media 152 or computer readable signal media 154.

Computer readable storage media 152 may include, for example, an optical or magnetic disk that is inserted or placed into a drive or other device that is part of persistent storage 142 for transfer onto a storage device, such as a hard drive, that is part of persistent storage 142. Computer readable storage media 152 also may take the form of a persistent storage, such as a hard drive, a thumb drive, or a flash memory, that is connected to processor unit 138. In some instances, computer readable storage media 152 may not be removable.

In these examples, computer readable storage media 152 is a physical or tangible storage device used to store program code 146 rather than a medium that propagates or transmits program code 146. Computer readable storage media 152 is also referred to as a computer readable tangible storage device or a computer readable physical storage device. In other words, computer readable storage media 152 is a media that can be touched by a person.

Alternatively, program code 146 may be transferred to processor unit 138 using computer readable signal media 154. Computer readable signal media 154 may be, for example, a propagated data signal containing program code 146. For example, computer readable signal media 154 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 146 may be downloaded over a network to persistent storage 142 from another device or data processing system through computer readable signal media 154 for use within processor unit 138. For instance, program code stored in a computer readable storage medium in a server data processing system may be downloaded over a network from the server to processor unit 138. The data processing system providing program code 146 may be a server computer, a client computer, or some other device capable of storing and transmitting program code 146.

The different components illustrated for processor unit 138 are not meant to provide architectural limitations to the manner in which different embodiments may be implemented. The different illustrative embodiments may be implemented in a processor unit including components in addition to or in place of those illustrated for processor unit 138.

Other components shown in FIG. 1 can be varied from the illustrative examples shown. The different embodiments may be implemented using any hardware device or system capable of running program code. As one example, controller 130 may include organic components integrated with inorganic components and/or may be comprised entirely of organic components excluding a human being. For example, a storage device may be comprised of an organic semiconductor.

In another illustrative example, processor unit 138 may take the form of a hardware unit that has circuits that are manufactured or configured for a particular use. This type of hardware may perform operations without needing program code 146 to be loaded into a memory from a storage device to be configured to perform the operations.

For example, when processor unit 138 takes the form of a hardware unit, processor unit 138 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 146 may be omitted, because the processes for the different embodiments are implemented in a hardware unit.

In still another illustrative example, processor unit 138 may be implemented using a combination of processors found in computers and hardware units. Processor unit 138 may have a number of hardware units and a number of processors that are configured to run program code 146. With this depicted example, some of the processes may be implemented in the number of hardware units, while other processes may be implemented in the number of processors.

Communications between and among processors 106, temperature sensors 114, devices 116, thermoelectric devices 128, and controller 130 may be implemented in any appropriate manner. For example, without limitation, communications between and among processors 106, temperature sensors 114, devices 116, thermoelectric devices 128, and controller 130 may be wired, wireless, optical or implemented in any other appropriate manner or combination of manners using any appropriate method or protocol or combination of methods and protocols for communications.

Figure 2:
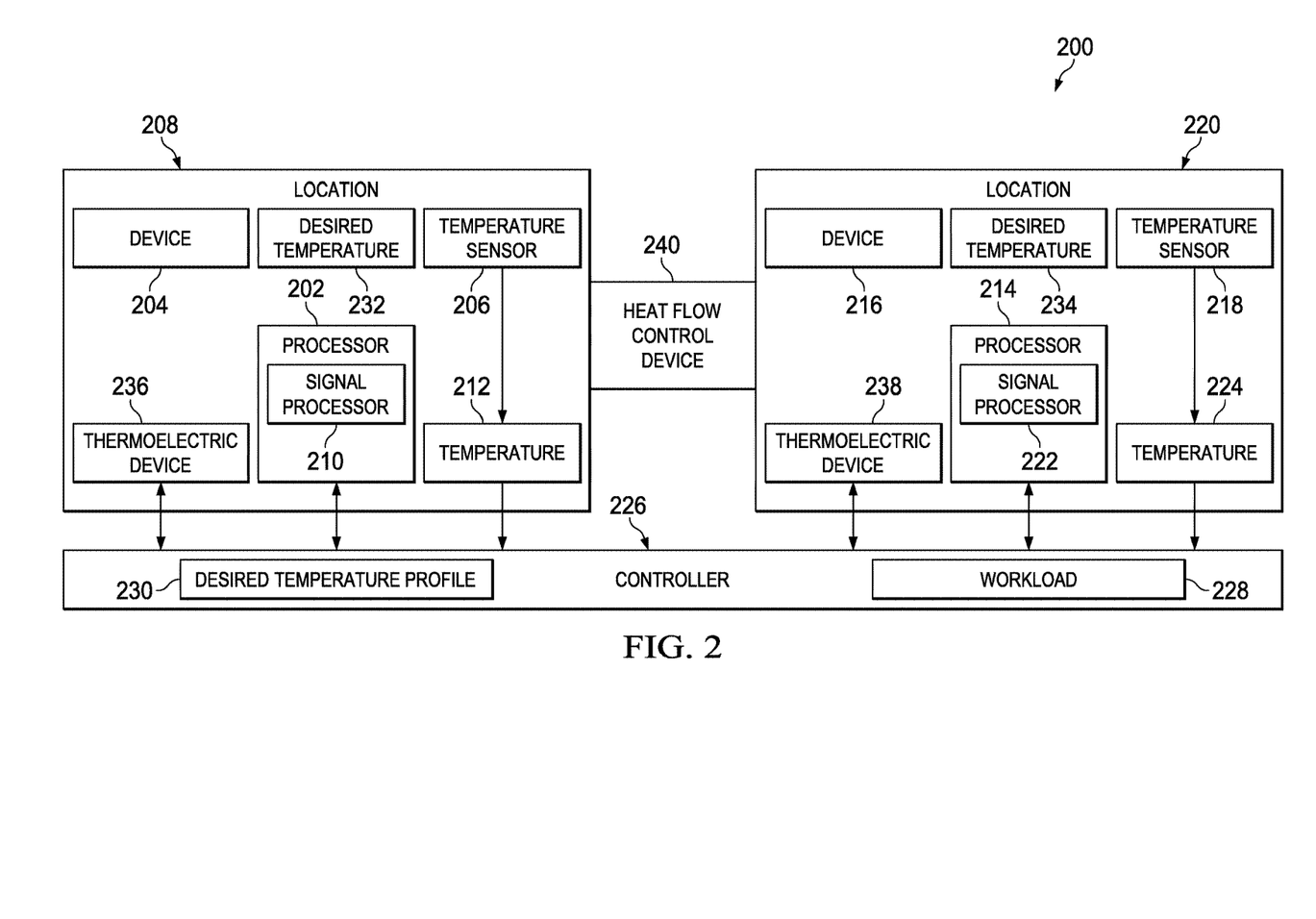
FIG. 2 is an illustration of a block diagram of a temperature controlled system in accordance with an illustrative embodiment.

Turning to FIG. 2, an illustration of a block diagram of a temperature controlled system is depicted in accordance with an illustrative embodiment. In this example, temperature controlled system 200 may be an example of one implementation of a temperature controlled system on structure 100 in FIG. 1.

Temperature controlled system 200 includes processor 202, device 204, and temperature sensor 206 at location 208. Processor 202 may include any appropriate data processing device configured to process any appropriate data at location 208. Device 204 may be any device other than processor 202 at location 208. For example, without limitation, processor 202 may comprise signal processor 210 configured to process signals associated with device 204. Device 204 may be a temperature sensitive device that is affected by temperature 212 at location 208. Temperature sensor 206 may be configured to identify temperature 212 at location 208. For example, without limitation, temperature sensor 206 may be configured to identify temperature 212 of processor 202, temperature 212 of device 204, or other appropriate temperature 212 at location 208. Location 208 may be referred to as a first location, processor 202 may be referred to as a first processor, device 204 may be referred to as a first device, temperature sensor 206 may be referred to as a first temperature sensor, and temperature 212 may be referred to as a first temperature.

Temperature controlled system 200 also includes processor 214, device 216, and temperature sensor 218 at location 220. Location 220 and location 208 are different locations. Processor 214 may include any appropriate data processing device configured to process any appropriate data at location 220. Device 216 may be any device other than processor 214 at location 220. For example, without limitation, processor 214 may comprise signal processor 222 configured to process signals associated with device 216. Device 216 may be a temperature sensitive device that is affected by temperature 224 at location 220. Temperature sensor 218 may be configured to identify temperature 224 at location 220. For example, without limitation, temperature sensor 218 may be configured to identify temperature 224 of processor 214, temperature 224 of device 216, or other appropriate temperature 224 at location 220. Location 220 may be referred to as a second location, processor 214 may be referred to as a second processor, device 216 may be referred to as a second device, temperature sensor 218 may be referred to as a second temperature sensor, and temperature 224 may be referred to as a second temperature.

Temperature controlled system 200 also includes controller 226. Controller 226 is configured to control the processing of workload 228 and temperatures 212 and 224 of locations 208 and 220, respectively. Workload 228 may comprise any number of data processing tasks that are to be performed by temperature controlled system 200. Controller 226 may be configured to control temperatures 212 and 224 of locations 208 and 220 in accordance with desired temperature profile 230. For example, desired temperature profile 230 may indicate desired temperature 232 for location 208 and desired temperature 234 for location 220. Desired temperature 232 may be referred to as a first desired temperature and desired temperature 234 may be referred to as a second desired temperature.

Controller 226 may be configured to receive information from temperature sensors 206 and 218 identifying temperatures 212 and 224 at locations 208 and 220, respectively. Controller 226 may be configured to compare temperatures 212 and 224 at locations 208 and 220 to desired temperatures 232 and 234, respectively. Controller 226 may then distribute the processing of workload 228 between processors 202 and 214 such that workload 132 is processed in an appropriate manner and such that the heat generated by processors 202 and 214 causes temperatures 212 and 224 of locations 208 and 220 to match desired temperatures 232 and 234, respectively.

Controller 226 may be configured to change the portions of workload 228 processed by processor 202 and processor 214 to increase and decrease temperatures 212 and 224 at locations 208 and 220, respectively. For example, without limitation, controller 226 may be configured to change the processing of workload 228 by moving threads and clocking between processor 202 and processor 214 to achieve and maintain desired temperature profile 230.

For example, controller 226 may be configured to increase temperature 224 at location 220 by moving the processing of a portion of workload 228 from processor 202 at location 208 to processor 214 at location 220. In this case, more heat may be generated by processor 214, causing temperature 224 at location 220 to be increased. Less heat may be generated by processor 202, causing temperature 212 at location 208 to be reduced.

As another example, controller 226 may be configured to increase temperature 224 at location 220 by duplicating the processing of a portion of workload 228 by processor 202 at location 208 by processor 214 at location 220. In this case, temperature 224 at location 220 may be increased due to the increased processing by processor 214 without reducing temperature 212 at location 208. For example, without limitation, data processing results provided by the first one of processor 202 or processor 214 to complete processing the portion of workload 228 may be used.

Temperature controlled system 200 also may include thermoelectric device 236 at location 208 and thermoelectric device 238 at location 220. Thermoelectric device 236 may be referred to as a first thermoelectric device. Thermoelectric device 238 may be referred to as a second thermoelectric device. In this case, controller 226 may be configured to control thermoelectric devices 236 and 238 along with the processing of workload 228 by processors 202 and 214 in an integrated manner to achieve and maintain desired temperatures 232 and 234 at locations 208 and 220, respectively.

Temperature controlled system 200 also may include heat flow control device 240. For example, without limitation, heat flow control device 240 may be located at one or more of location 208 and location 220, between location 208 and location 220, or both. Heat flow control device 240 may be configured and positioned to control the flow of heat between location 208 and location 220, within location 208 or location 220, or both, in a desired manner.

The illustrations of FIG. 1 and FIG. 2 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, illustrative embodiments may be used to control the temperature at more than two locations on a structure or in a temperature controlled system. Each location on such a structure or in such a temperature controlled system may include any appropriate combination of processors, temperature sensitive devices, thermoelectric devices, and heat flow control devices. Different locations on such a structure or in such a temperature controlled system may include the same or different combinations of processors, temperature sensitive devices, thermoelectric devices, and heat flow control devices.

Figure 3:
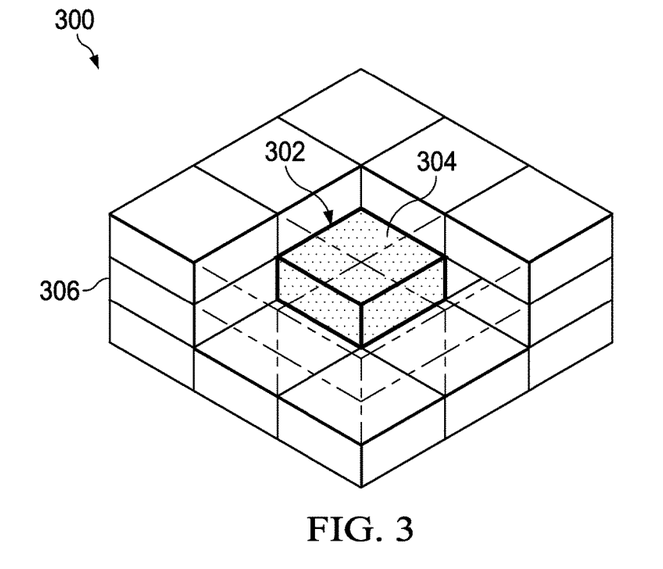
FIG. 3 is an illustration of a temperature controlled structure in accordance with an illustrative embodiment.

Turning to FIG. 3, an illustration of a temperature controlled structure is depicted in accordance with an illustrative embodiment. In this example, structure 300 is an example of one implementation of structure 100 in FIG. 1. In this example, structure 300 is a generic three-dimensional block structure comprising cubic blocks. Illustrative embodiments may be implemented and used in other appropriate three-dimensional and two-dimensional structures. For example, without limitation, illustrative embodiments may be implemented in three-dimensional structures with geodesic or other geometries.

Structure 300 includes block 302. Block 302 has a number of faces 304. Each of faces 304 of block 302 may correspond to a different location on structure 300.

Temperature sensors may be implemented in any appropriate manner on one or more faces 304 of block 302. These temperature sensors may be configured to identify the temperatures at faces 304 of block 302. Processors also may be implemented in any appropriate manner on one or more faces 304 of block 302. Alternatively, or in addition, processors may be implemented in one or more blocks 306 adjacent to faces 304 of block 302.

Temperature sensitive devices may be implemented in blocks 306 adjacent to faces 304 of block 302. In this case, the temperatures identified by temperature sensors on faces 304 of block 302 may correspond to the temperatures of the devices implemented in blocks 306 adjacent to block 302. Block 302 and blocks 306 may be made in any appropriate manner of any appropriate material. For example, without limitation, block 302 and blocks 306 may be implemented on integrated circuit dies to create a consistent and controllable thermal interface between block 302 and blocks 306. Any appropriate interface may be provided for communications between devices implemented in blocks 306 and processors implemented on faces 304 of block 302.

Data processing performed by the processors on faces 304 of block 302, in blocks 306 adjacent to block 302, or both, may be controlled to control the temperatures at faces 304 of block 302 and thus the temperatures of the temperature sensitive devices in blocks 306 adjacent to faces 304 of block 302.

Figure 4:
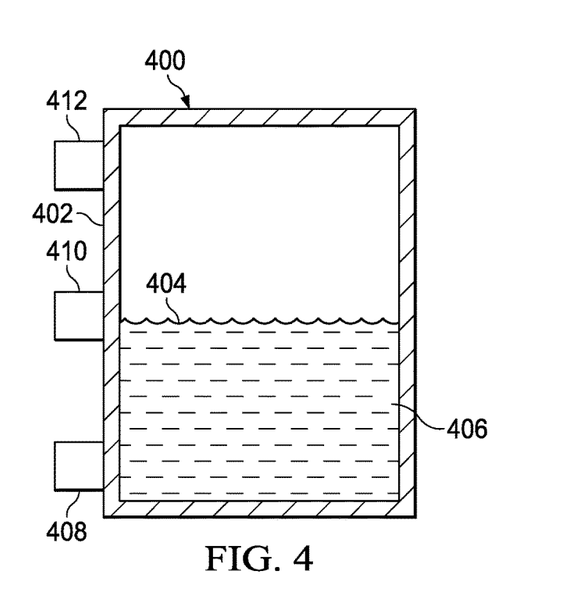
FIG. 4 is an illustration of processors at locations on a fuel tank in accordance with an illustrative embodiment.

Turning to FIG. 4, an illustration of processors at locations on a fuel tank is depicted in accordance with an illustrative embodiment. In this example, fuel tank 400 is an example of one implementation of structure 100 in FIG. 1. For example, without limitation, fuel tank 400 may be an example of structure 100 on aircraft 102 in FIG. 1.

Fuel tank 400 may be configured to contain any appropriate fuel. For example, without limitation, fuel tank 400 may be configured to contain fuel for an aircraft. In this example, side 402 of fuel tank 400 is cut away to show level 404 of fuel 406 in fuel tank 400.

Processors 408, 410, and 412 may be positioned at various locations on side 402 of fuel tank 400. For example, processors 408, 410, and 412 may be positioned on side 402 of fuel tank 400 so that processors 408, 410, and 412 may be cooled by fuel 406 in fuel tank 400. Alternatively, processors 408, 410, and 412 may be positioned on side 402 of fuel tank 400 so that the temperature of fuel 406 in fuel tank 400 may be controlled using the heat produced by processors 408, 410, and 412. In any case, the processing of a workload by processors 408, 410, and 412 may be controlled and changed in an appropriate manner as level 404 of fuel 406 in fuel tank 400 changes to maintain fuel 406, processors 408, 410, and 412, or both at desired temperatures.

Figure 5:
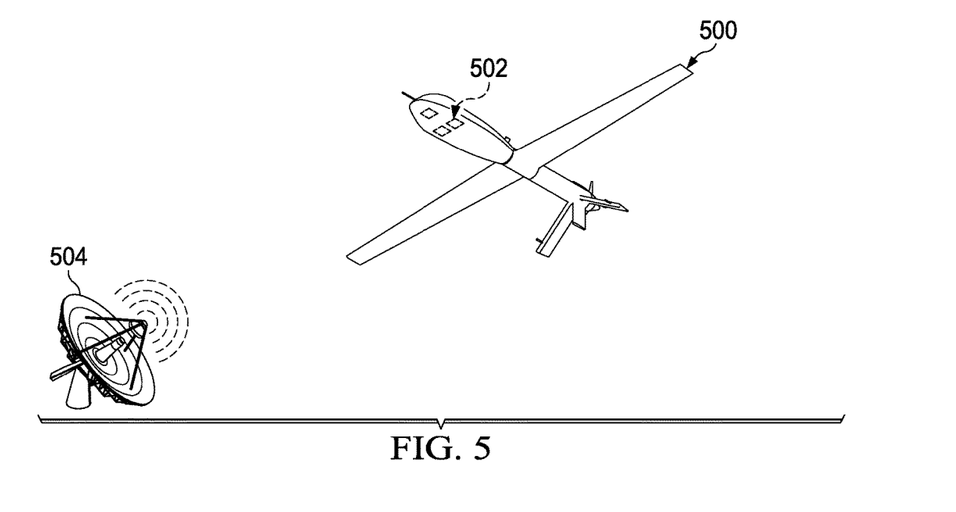
FIG. 5 is an illustration of controlling a temperature signature of an aircraft in accordance with an illustrative embodiment.

Turning to FIG. 5, an illustration of controlling a temperature signature of an aircraft is depicted in accordance with an illustrative embodiment. In this example, aircraft 500 may be an example of one implementation of aircraft 102 in FIG. 1.

Processors 502 may be positioned at a plurality of different locations on aircraft 500. The processing of a workload by processors 502 at the various locations on aircraft 500 may be controlled to control the temperatures at the various locations on aircraft 500 in the manner described above. For example, without limitation, the temperatures of various locations on aircraft 500 may be controlled in this manner to make it more difficult for aircraft 500 to be detected or identified by sensor 504.

Sensor 504 may be configured to detect and identify aircraft 500 by the heat signature produced by aircraft 500. Moving the processing of a workload between processors 502 at various different locations on aircraft 500 may allow individual ones of processors 502 more time to cool between operating cycles, thereby keeping the heat signature of aircraft 500 lower. Aircraft 500 having a lower heat signature may be more difficult to detect by sensor 504.

Alternatively, or in addition, the processing of a workload by processors 502 on aircraft 500 may be controlled to mask or change the heat signature of aircraft 500 in other ways. For example, without limitation, the processing of a workload by processors 502 on aircraft 500 may be controlled to create a heat signature for aircraft 500 that more closely resembles a type of aircraft other than aircraft 500. Changing the heat signature of aircraft 500 may make it more difficult for sensor 504 to identify aircraft 500 correctly, even when aircraft 500 is detected by sensor 504.

Figure 6:
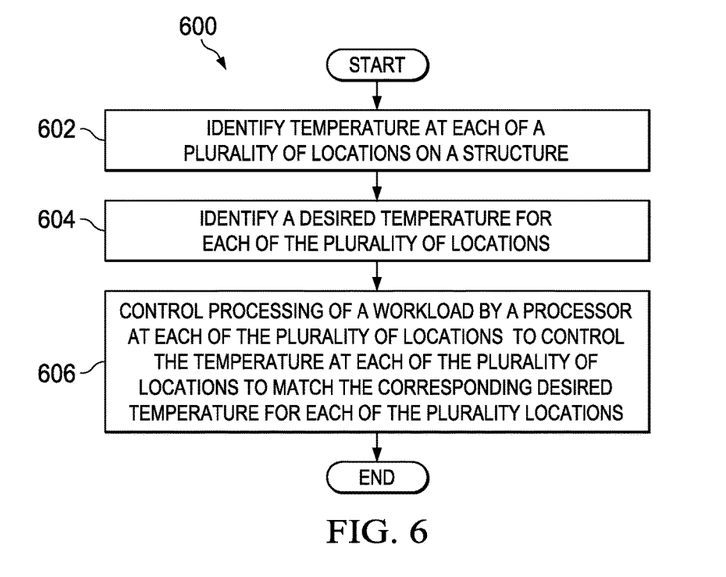
FIG. 6 is an illustration of a flowchart of a process for controlling temperatures of a plurality of locations on a structure in accordance with an illustrative embodiment.

Turning to FIG. 6, an illustration of a flowchart of a process for controlling temperatures of a plurality of locations on a structure is depicted in accordance with an illustrative embodiment. For example, without limitation, process 600 may be implemented in controller 130 to control temperatures 112 at plurality of locations 108 on structure 100 in FIG. 1.

Process 600 may begin by identifying the temperature at each of a plurality of locations on a structure (operation 602). For example, the temperature at each of the plurality of locations may be identified using an appropriate temperature sensor at each of the plurality of locations. A desired temperature for each of the plurality of locations then may be identified (operation 604). For example, the desired temperature for each of the plurality of locations may be identified in a desired temperature profile for the structure. The processing of a workload by a processor at each of the plurality of locations then may be controlled to control the temperature at each of the plurality of locations to match the corresponding desired temperature for each of the plurality of locations (operation 606), with the process terminating thereafter.

Figure 7:
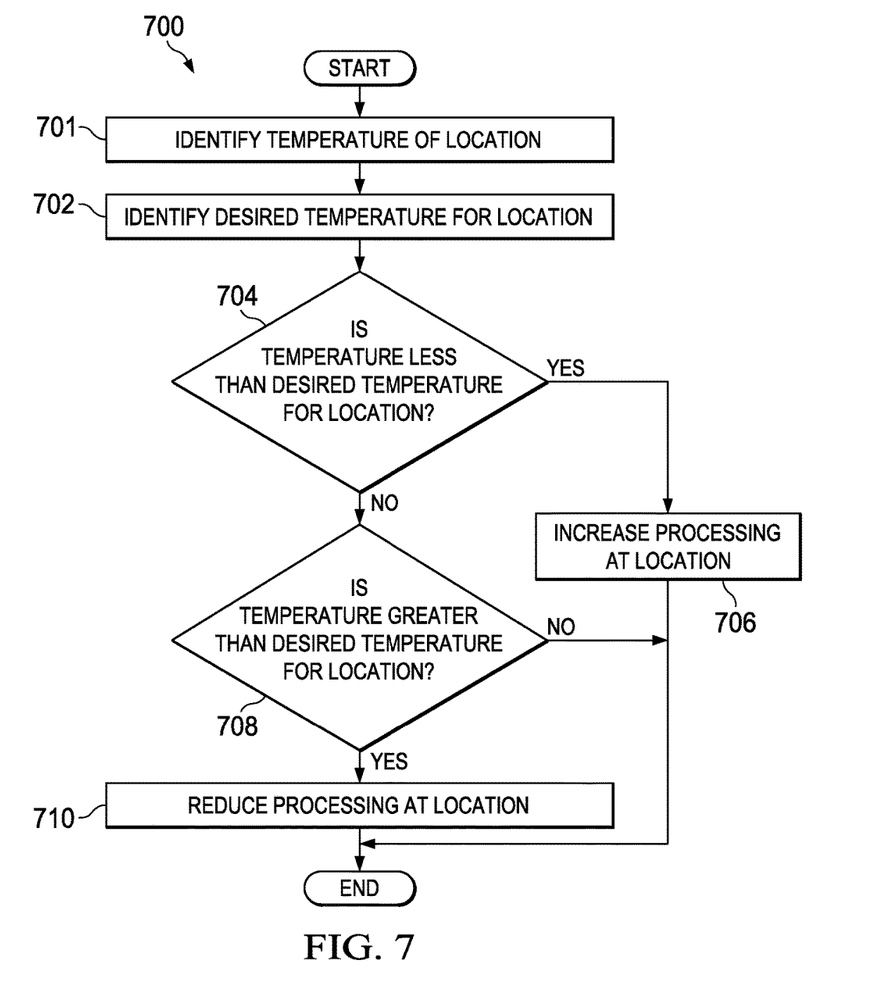
FIG. 7 is an illustration of a flowchart of a process for controlling the temperature of a location on a structure in accordance with an illustrative embodiment.

Turning to FIG. 7, an illustration of a flowchart of a process for controlling the temperature of a location on a structure is depicted in accordance with an illustrative embodiment. For example, without limitation, process 700 may be implemented in controller 130 to control the temperature at one of locations 108 on structure 100 in FIG. 1.

Process 700 may begin by identifying the temperature of a location (operation 701). For example, the temperature of the location may be identified using an appropriate temperature sensor at the location. A desired temperature for the location may be identified (operation 702).

It then may be determined whether the temperature of the location identified at operation 701 is less than the desired temperature for the location identified at operation 702 (operation 704). If the temperature of the location is less than the desired temperature of the location, processing of a workload by a processor at the location may be increased (operation 706) to increase the temperature at the location to the desired temperature, with the process terminating thereafter.

In response to a determination at operation 704 that the temperature at the location is not less than the desired temperature for the location, it may be determined whether the temperature at the location is greater than the desired temperature for the location (operation 708). If the temperature at the location is greater than the desired temperature for the location, processing of the workload by a processor unit at the location may be reduced (operation 710) to reduce the amount of heat generated by the processor at the location, with the process terminating thereafter.

If the temperature at the location is not greater than or less than the desired temperature, the process may terminate without changing the processing of the workload performed at the location. Process 700 may be repeated continuously or periodically to maintain the temperature of the location at the desired temperature for the location.

The flowcharts and block diagrams in the different depicted embodiments illustrate the architecture, functionality, and operation of some possible implementations of apparatuses and methods in illustrative embodiments. In this regard, each block in the flowcharts or block diagrams may represent a module, segment, function, and/or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order shown in the figures. For example, in some cases, the functions of two blocks shown in succession may be executed substantially concurrently, or the functions may sometimes be performed in the reverse order, depending upon the functionality involved. Also, other functions may be added in addition to the functions illustrated in a flowchart or block diagram.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of controlling temperatures of a plurality of locations on a structure, comprising:
    identifying a temperature at each of a plurality of faces of a three-dimensional structure;
    identifying a desired temperature for the each of the plurality of faces of the three-dimensional structure; and
    controlling processing of a workload by a processor on each of the plurality of faces of the three-dimensional structure to control the temperature at the each of the plurality of faces of the three-dimensional structure to match a corresponding desired temperature for the each of the plurality of faces of the three-dimensional structure.

2. The method of claim 1, wherein the desired temperature for the each of the plurality of faces of the three-dimensional structure is selected from a range of temperatures and a temperature threshold.

3. The method of claim 1, wherein:
    the temperature at the each of the plurality of faces of the three-dimensional structure is the temperature of a device other than the processor implemented adjacent to each of the plurality of faces of the three-dimensional structure and the desired temperature for the each of the plurality of faces of the three-dimensional structure is the desired temperature for the device other than the processor implemented adjacent to each of the plurality of locations; and
    the device other than the processor is selected from an electrical device, an electromechanical device, a micro-electromechanical device, an inertial measurement unit, a software defined radio, and a crystal oscillator.

4. The method of claim 3, wherein the processor on one of the plurality of faces of the three-dimensional structure comprises a signal processor configured to process a signal associated with the device other than the processor implemented adjacent to the one of the plurality of locations.

5. The method of claim 1, wherein controlling processing of the workload comprises distributing the workload to the processors on the plurality of faces of the three-dimensional structure by the processor on one of the plurality of faces of the three-dimensional structure.

6. The method of claim 1, wherein controlling processing of the workload comprises changing processing of a portion of the workload from a first processor on a first one of the plurality of faces of the three-dimensional structure to a second processor on a second one of the plurality of faces of the three-dimensional structure to reduce the temperature at the first one of the plurality of faces of the three-dimensional structure and to increase the temperature at the second one of the plurality of faces of the three-dimensional structure.

7. The method of claim 1, wherein controlling processing of the workload comprises duplicating at a second processor on a second one of the plurality of faces of the three-dimensional structure processing of a portion of the workload processed by a first processor on a first one of the plurality of faces of the three-dimensional structure to increase the temperature at the second one of the plurality of faces of the three-dimensional structure without reducing the temperature at the first one of the plurality of faces of the three-dimensional structure.

8. The method of claim 1, wherein the three-dimensional structure is on an aircraft.

9. An apparatus, comprising:
    a temperature sensor on each of a plurality of faces on a three-dimensional structure, wherein each temperature sensor is configured to identify a temperature at a corresponding one of the plurality of faces of the three-dimensional structure;
    a processor on each of the plurality of faces of the three-dimensional structure;
    a controller configured to receive information identifying the temperature at the each of the plurality of faces of the three-dimensional structure from the temperature sensor at the each of the plurality of faces of the three-dimensional structure and to control processing of a workload by the processor on the each of the plurality of faces of the three-dimensional structure to control the temperature at the each of the plurality of faces of the three-dimensional structure to match a desired temperature for the each of the plurality of faces of the three-dimensional structure.

10. The apparatus of claim 9, wherein the desired temperature for the each of the plurality of faces of the three-dimensional structure is selected from a range of temperatures and a temperature threshold.

11. The apparatus of claim 9 further comprising a device other than the processor implemented adjacent to each of the plurality of faces of the three-dimensional structure, wherein the temperature at the each of the plurality of faces of the three-dimensional structure is the temperature of the device other than the processor implemented adjacent to each of the plurality of faces of the three-dimensional structure and the desired temperature for the each of the plurality of faces of the three-dimensional structure is the desired temperature for the device other than the processor implemented adjacent to each of the plurality of faces of the three-dimensional structure, and wherein the device other than the processor is selected from an electrical device, an electromechanical device, a micro-electromechanical device, an inertial measurement unit, a software defined radio, and a crystal oscillator.

12. The apparatus of claim 11, wherein the processor on one of the plurality of faces of the three-dimensional structure comprises a signal processor configured to process a signal associated with the device other than the processor implemented adjacent to the one of the plurality of faces of the three-dimensional structure.

13. The apparatus of claim 9, wherein the controller is implemented in the processor on one of the plurality of faces of the three-dimensional structure.

14. The apparatus of claim 9, wherein the controller is configured to change processing of a portion of the workload from a first processor on a first one of the plurality of faces of the three-dimensional structure to a second processor on a second one of the plurality of faces of the three-dimensional structure to reduce the temperature at the first one of the plurality of faces of the three-dimensional structure and to increase the temperature at the second one of the plurality of faces of the three-dimensional structure.

15. The apparatus of claim 9, wherein the controller is configured to duplicate at a second processor on a second one of the plurality of faces of the three-dimensional structure processing of a portion of the workload processed by a first processor on a first one of the plurality of faces of the three-dimensional structure to increase the temperature at the second one of the plurality of faces of the three-dimensional structure without reducing the temperature at the first one of the plurality of faces of the three-dimensional structure.

16. The apparatus of claim 9, wherein the three-dimensional structure is on an aircraft.

17. A method of controlling a temperature at a location on a structure, comprising:
   identifying the temperature of a processor at the location;
   identifying a desired temperature for the processor at the location; and
   controlling processing of a workload by the processor at the location to increase the temperature of the processor at the location to match the desired temperature for the processor at the location.

\* \* \* \* \*